3,780,140
ETHYLENE/CARBON MONOXIDE POLYMER COMPOSITIONS

Clarence Frederick Hammer, Wilmington, Del., assignor to E. I. du Pont de Nemours and Company, Wilmington, Del.
Filed Aug. 6, 1971, Ser. No. 169,792
Int. Cl. C08f 29/12
U.S. Cl. 260—884                   11 Claims

ABSTRACT OF THE DISCLOSURE

Copolymers of certain amounts of ethylene, carbon monoxide and one or more termonomers copolymerizable therewith to produce solid products. The copolymers are useful as molding resins and as blending resins. Blends of these copolymers with solid organic polymers such as polyvinyl chloride wax, etc., are compatible and are useful as molding resins. These blends may be used, for example, to produce flexible films and rigid or semirigid articles.

BACKGROUND OF THE INVENTION

This invention relates to ethylene copolymers and compositions and shaped articles formed therefrom. More particularly, this invention relates to copolymers of ethylene/carbon monoxide/termonomer, and polymeric blends and shaped articles formed therefrom.

Ethylene polymers are characterized by low polarity. They are like waxes in this respect, having a low dielectric constant and being soluble in hot oils, hot wax and hot hydrocarbons. For some uses, it would be desirable to impart more polarity to ethylene polymers to provide improved adhesion thereof to more polar materials and to provide resistance thereof to hydrocarbon solvents and oils. A small degree of polarity can be imparted to an ethylene chain by incorporation therein of unsaturated organic esters, such as vinyl acetate or acrylates. However, to obtain a high degree of polarity high levels of ester are required, which in turn adversely affects the inherent advantages of the long flexible ethylene chain, e.g., low cost, good low temperature behavior, etc. Thus, it is desirable to increase the polarity of an ethylene polymer while retaining the hydrocarbon chain as the major feature of the polymer.

The art regarding blends of polymers will now be considered. Commercially available plastics such as polyvinyl chloride, nitrocellulose, and cellulose acetate butyrate have been found to be useful because of the high rigidity of objects molded therefrom. However, this rigidity is often accompanied by brittleness or lack of toughness, making it desirable to lower the stiffness of such materials. This has often been accomplished commercially by the addition of plasticizers, that is, materials of low molecular weight which are compatible with the plastic in question. The success of this technique is demonstrated by the fact that over one billion pounds of materials used as plasticizers were sold in the year 1970. A wide variety of materials have been used as plasticizers for polyvinyl chloride. These materials are liquids of viscosities such that they are usually characterized as oils or syrups. Even those designated as "polymeric" have molecular weights of a few thousand or below and are in reality very viscous liquids at 25° C. Such low molecular weight plasticizers for polyvinyl chloride suffer from the common difficulty of being migratory in articles made from the resultant blend, and thus move easily to the surface of a fabricated article. Consequently, they are removed by soapy water, solvent or even by slow evaporation. Thus, more permanent plasticizers for polyvinyl chloride are needed.

SUMMARY OF THE INVENTION

According to the present invention there are provided copolymers consisting essentially of, by weight (a) 40–80% ethylene, (b) 3–30% carbon monoxide, and (c) 5–60% of one or more termonomers copolymerizable therewith to produce solid copolymers. Preferred copolymers include those consisting essentially of 56–76% ethylene, 3–15% carbon monoxide, and 10–34% of said termonomer(s). More preferred copolymers include those in which vinyl acetate is the termonomer. The copolymers normally have a melt index within the range 0.1–3000, preferably 1–500. Also provided are shaped articles of these copolymers.

Also part of this invention are polymeric compositions of matter comprising blends of the above copolymers with compatible amounts of various solid organic blend polymers, as prescribed herein. The term compatible is defined below for purposes of this invention. A preferred solid organic blend polymer is polyvinyl chloride. By the term "polyvinyl chloride" is meant homopolymers of vinyl chloride as well as copolymers thereof containing up to 20% of other monomers such as vinyl acetate, propylene, ethylene, butyl vinyl ether, diethyl maleate, dimethyl fumarate, etc. Also intended in chlorinated polyvinyl chloride such as it disclosed in French Pat. 1,220,932.

The blend compositions of the present invention may comprise, by weight, 5–95% of the above copolymer and 5–95% polyvinyl chloride. When blend polymers other than polyvinyl chloride are used, varying preferred proportions of copolymer and blend polymer are employed.

When the blend polymer is polyvinyl chloride, compositions useful for producing films comprise 30–65% polyvinyl chloride and 35–70% of a copolymer consisting essentially of 40–80% ethylene, 10–60% vinyl acetate and 3–30% carbon monoxide. For producing rigid articles, a blend composition is preferred which comprises 75–95% polyvinyl chloride and 5–25% of a copolymer consisting essentially of 40–80% ethylene, 5–50% vinyl acetate and 3–10% carbon monoxide. For semirigid objects, a blend composition is preferred which comprises 50–75% polyvinyl chloride and 25–50% of a copolymer consisting essentially of 40–80% ethylene, 5–50% vinyl acetate and 3–10% carbon monoxide. Also provided by this invention are easily processible compositions of matter comprising 5–30% polyvinyl chloride and 70–95% of the above copolymers.

Where the polymer to be blended with the copolymer of the present invention is wax, the preferred copolymer contains no more than about 5% carbon monoxide. Where the termonomer is vinyl acetate, 10–26% vinyl acetate is normally preferred. The blends preferably contain 5–40% copolymer and 60–95% wax, by weight.

DETAILED DESCRIPTION

The copolymers of this invention consist essentially of the above prescribed amounts of ethylene, carbon monoxide and one or more termonomers which are copolymerizable ethylenically unsaturated organic compounds. Such termonomers are selected from the class consisting of unsaturated mono- and dicarboxylic acids of 3–20 carbon atoms, esters of such unsaturated mono- or dicarboxylic acids, vinyl esters of saturated carboxylic acids wherein the acid group has 1–18 carbon atoms, vinyl alkyl ethers wherein the alkyl group has 1–18 carbon atoms, acrylonitrile, methacrylonitrile, copolymerizable unsaturated hydrocarbons such as alpha-olefins of 3–12 carbon atoms, ring compounds such as norbornene and vinyl aromatic compounds.

The proportions of the various monomers in the copolymers are set forth above. The melt index of the copolymers of this invention is within the range 0.1–3000, preferably 1–500.

In preparing the copolymers of the present invention, commercially available ethylene, carbon monoxide and other monomers of about 100% purity are used initially and in supplying continuous make-up for the polymerization feed stream. The reactor vessel used is capable of withstanding high pressures and temperatures, and is equipped with a high speed motor-driven stirrer and pressure relief valves, as well as jacketed walls for circulating heating or cooling fluids in order to control temperature. Carbon monoxide and the other monomer(s) are pumped into the ethylene monomer feed stream at the pressure of the reactor, and then the mixture of monomers is pumped at reactor pressure into the reactor, either together or separately. Catalyst, as necessary, is pumped into the reactor through a separate feed line.

A mixture of copolymer and monomer exits the reactor, and the pressure is reduced as the mixture flows into a separator. Monomers leave the separator and are either destroyed or pumped for recycle to the reactor together with make-up monomers. Molten copolymer leaves the separator in a stream, from which it is cooled and further processed, e.g., the copolymer may be cut into suitable sized particles or blended before being cooled with compatible amounts of other polymers, such as polyvinyl chloride, etc., to improve its handling characteristics. Such amounts of polyvinyl chloride are in the range 5–30% by weight of the total weight of polyvinyl chloride and such copolymers.

The flow of ethylene, carbon monoxide, monomers and catalyst into the reactor is carefully controlled so that they enter the reactor in constant continuous molar ratios and at the same continuous rate at which product and unreacted monomers are discharged from the reactor. The rates and molar ratios are adjusted so as to provide in the product copolymer, by weight, 40–80% ethylene, 3–30% carbon monoxide, and 5–60% of other termonomer(s). Effective stirring, usually at a rate of at least 0.25 horsepower per gallon of reactor volume, is provided in order to keep the reacting monomers in intimate admixture throughout the reactor. The reactor temperature should be at least 140° C. It is preferred that the reactor temperature be maintained within the range of about 155–300° C., most preferably 155–225° C., and that the reactor pressure be maintained within the range 5000–60,000 p.s.i., preferably about 20,000–35,000 p.s.i.

It is important in preparing the copolymers of the present invention that the contents of the reactor be kept uniform with respect to the weight ratios of ethylene, carbon monoxide and termonomer to produce the solid copolymers of the present invention. None of the monomers should be depleted so that only one or two monomers are reacting. Since the various monomers react at different rates, a larger percentage of faster reacting monomers will react in a given time. Consequently, the rate of feeding the various monomers will vary. Thus, carbon monoxide reacts at a rate about five times that of ethylene, so that when 10% of the ethylene present has been incorporated in polymer, about 50% of the carbon monoxide present is in polymer. Conditions required to produce specific copolymers vary, depending on termonomer reactivity, e.g., vinyl acetate reacts at about the same rate as does ethylene, whereas other termonomers such as methyl methacrylate react about as fast as or faster than carbon monoxide.

The free-radical polymerization catalyst employed in the process can be any of those commonly used in the polymerization of ethylene, such as the peroxides, the peresters, the azo compounds, or the percarbonates. Selected compounds within these groups are dilauroyl peroxide, ditertiary butyl peroxide, tertiary butyl perisobutyrate, tertiary butyl peracetate, $\alpha,\alpha'$-azobisisobutyronitrile and other compounds of comparable free-radical activity. Usually, the catalyst will be dissolved in a suitable inert organic liquid solvent such as benene, kerosene, mineral oil or mixtures of solvents. The usual catalyst level is used, i.e., about 25 to 2500 p.p.m., preferably about 75 to 500 p.p.m., based on the weight of the monomers fed to the reactor.

The copolymers of the present invention can be used to make self-supporting film and for jacketing material as well as for many polyethylene application areas where better performance is desired.

The copolymers of the present invention are particularly useful for blending with other organic polymers, especially those having polar characteristics, such as polyvinyl chloride, to improve the properties of the latter.

It is important for the purpose of this invention to understand the nature of blends of high polymers and to understand the advantages to be obtained from such blends. Blends of high polymers can be divided into three broad categories. The first category includes blends which are compatible in the purest sense, i.e., on a molecular scale. Such blends form clear films. The second category includes blends which are not totally compatible on a molecular scale, but which do have a sufficient degree of molecular compatibility or molecular interaction to provide useful polymeric blend materials. Such blends usually yield opaque or hazy films, which blush (e.g., turns white) upon being bent double, although the films are strong and tough and generally tear resistant. Polymer blends presently available commercially which would typify the second category of compatibility are materials such as the ABS resins or high impact strength grades of polystyrene. The third category of polymer blends are those in which the compatibility of the two polymeric systems involved is so low that there is no useful behavior. Such systems are those blends made from two strong materials, whose blends are brittle and tear easily.

The present invention relates to the first *two* broad categories of compatibility. In the claims and elsewhere in this application, the term "compatible" is used to designate compatibility in the first two senses. The presence of carbon monoxide and the termonomers described above in the copolymers of the present invention may enable a particular blend of such copolymers with other organic polymers to obtain complete molecular compatibility and, thus, result in clear products having high strength and toughness. In other systems according to the present invention, the presence of carbon monoxide and such termonomers in the copolymers of the present invention can result in sufficient molecular interaction between the copolymer of this invention and the other component of the blend that the blends exhibit useful behavior with good physical strength, despite the fact that they may be hazy or transulcent, indicating less than complete molecular compatibility.

Generally, the copolymers of the present invention can be blended with the other organic polymers in any order of addition by any of the usual techniques, such as solution blending or melt blending on a roll mill, in an extruder or in a Banbury mixer, with the result that the blended polymer composition thereby formed contains a compatible amount of the blend polymer and the copolymer of the present invention. The blend contains 5–95% of the copolymer of the present invention and 5–95% of the blend polymer (by weight). If it is desired to produce a copolymer which is tacky, its handling characteristics can be improved by initially blending 5–30% of a desired harder blend polymer therewith, and subsequently mixing in additional amounts of the blend polymer when desired. The particular compatible level of copolymer added will depend upon the particular blend polymer employed, the particular copolymer used and the physical properties desired in the shaped articles formed from the blend (e.g., limp film; rigid or semirigid articles).

The blend polymers (solid organic polymers) used for preparing the blend compositions of the present invention can be any organic polymer, although it is preferred that the blend polymer have polar characteristics, indicative that the copolymers of the present invention can be compatible therewith on a molecular scale, that is, be clear. Blend polymers that can be used are polyamides; cellulose-derived polymers such as cellulose acetate, propionate, butyrate, regenerated cellulose and nitrocellulose; vinyl halide polymers in which the vinyl halide is at least 80 percent by weight of the polymer, such as polyvinyl chloride, copolymers of vinyl chloride with olefins (ethylene and propylene particularly), vinyl acetate, and vinyl ethers, vinylidene halide polymers such as polyvinylidene fluoride and a copolymer of vinylidene chloride and vinyl chloride; alpha-olefin-based polymers having 2 to 12 carbon atoms, such as polyethylene, polypropylene, chlorosulfonated polyethylene, chlorinated polyethylene as well as other halogenated polyolefins, ionomers [ethylene/(meth)acrylic acid copolymers neutralized with an alkali metal hydroxide], ethylene/vinyl ester copolymers (i.e., vinyl ester of saturated carboxylic acid such as vinyl acetate, vinyl propionate, vinyl butyrate, vinyl stearate) of about 15 to 98 percent vinyl ester and hydrolyzed polymers derived therefrom (ethylene/vinyl alcohol), polymers of styrene such as styrene/methacrylic acid, styrene/acrylonitrile; polymers of acrylonitrile such as polyacrylonitrile, copolymers of at least 40 percent acrylonitrile using other ethylenically unsaturated comonomers such as vinyl acetate, vinyl chloride, ethylene and isobutylene; acrylics such as alkyl esters of ethylenically unsaturated carboxylic acids such as alkyl acrylates and alkyl methacrylates wherein the alkyl group is from 1 to 18 carbon atoms; polyesters such as polyethylene terephthalate and poly-1,4,cyclohexalene dimethylene terephthalate; polyurethanes; polycarbonates; phenolics; polysulfones, epoxy resins; chlorinated polyethers; alkyd resins; acetal resins; ABS resins; silicone resins; tars (asphalt) and waxes such as the petroleum waxes (paraffin wax and microcrystalline wax), and chlorinated waxes.

In making shaped articles from either the copolymers of the present invention or the blended polymeric compositions of the present invention, which include the aforesaid copolymers, other materials may be added to perform their usual functions. For instance, antioxidants, ultraviolet stabilizers, plasticizers, pigments, fillers, slip and antiblock agents, etc., can be used.

The blends of the present invention may be used for forming limp films, rigid objects, semirigid objects, etc. No sharp definition has been used in the art to define the terms limp, semirigid, and rigid. These terms may depend upon the field of interest. "Rigid" usually applies to the maximum stiffness attainable with a particular material, and "semirigid" usually means something somewhat less stiff than the maximum. For polyvinyl chloride, "rigid" usually means a stiffness of 350,000–600,000 p.s.i., "semirigid" a stiffness of 50,000–350,000 p.s.i., and "limp" (or flexible) a stiffness of 500–50,000 p.s.i.

Where polyvinyl chloride is the blend polymer, limp films may be made from a blend composition comprising 30–65% polyvinyl chloride and 35–70% of a copolymer containing 40–80% ethylene, 10–60% vinyl acetate, and 3–30% carbon monoxide. Where other termonomers than vinyl acetate are employed with ethylene and carbon monoxide, varying amounts of those termonomers may preferably be employed. Rigid articles may be produced from a blend composition comprising 75–95% polyvinyl chloride and 5–25% of a copolymer consisting essentially of at least 40% ethylene, 5–50% vinyl acetate and 3–10% carbon monoxide. Semirigid articles may be produced from blend compositions comprising 50–75% polyvinyl chloride and 25–50% of a copolymer consisting essentially of at least 40% ethylene, 5–50% vinyl acetate and 3–10% carbon monoxide.

Where other blend polymers or other termonomers are used, varying percentages of termonomer in the copolymer and copolymer in the blend may preferably be employed.

The following examples are presented to illustrate, but not to restrict, the present invention. Percentages and parts are by weight both in the examples and elsewhere in the specification, unless otherwise stated.

Examples 1–26

Copolymers of ethylene, carbon monoxide and a termonomer (either vinyl acetate, methyl methacrylate, vinyl propionate, methyl vinyl ether or isobutyl acrylate, etc., as specified in Table I) were prepared by mixing the respective monomers at the feed rates shown in Table I, then feeding the resultant mixture into a 700-cc. highly-stirred reaction vessel together with a catalyst (type and amount in Table I). The catalyst was fed at a rate sufficient to obtain the desired conversion.

In the various examples the reactor pressure and temperature were maintained between 24,000 and 27,000 p.s.i. and 160 and 230° C., respectively. Reactor residence time was 4.5 minutes. Conversions were about 10% (based on total monomers fed).

The reaction mixture was discharged from the reactor, and the molten terpolymer was cooled and cut into pellets. Melt index determined according to ASTM D 1238–65T, condition E, is reported in Table I. The following physical properties of the copolymers of selected examples show that the product had the softness required of resins for blending with polymers such as polyvinyl chloride, etc. (ASTM D 882, 10 inches/min. for tensile strength, 1 inch/min. for tensile modulus):

| Copolymer of Example No. | Tensile strength (p.s.i.) | Tensile modulus (p.s.i.) | Elongation (percent) |
|---|---|---|---|
| 12 | 1,060 | 1,280 | 960 |
| 1 | 1,690 | 1,670 | 880 |
| 13 | 1,260 | 970 | 960 |
| 3 | 540 | 270 | 1,310 |

TABLE I.—COPOLYMER SYNTHESIS

| | Product copolymer | | | Reaction conditions | | | | | |
|---|---|---|---|---|---|---|---|---|---|
| | | | | | | Catalyst | | | |
| Example No. | Copolymer type[1] | Monomer ratio | Melt index | Pressure (p.s.i.) | Temp. (° C.) | Type | Concentration[2] | Feed ratio E/termonomer/CO (parts by wt.) | Conversion (percent) |
| 1 | E/VA/CO | 67/18/15 | 1.0 | 27,000 | 177 | t-Bu-peroxy isobutyrate | 0.27 | 6.5/2/0.22 | 10.6 |
| 2 | E/VA/CO | 76/15/9 | 0.16 | 27,000 | 180 | Azo diisobutyronitrile | 0.045 | 7.9/1.7/0.1 | 9.9 |
| 3 | E/VA/CO | 57/31/12 | 18 | 27,000 | 180 | ...do... | 0.52 | 9/5.2/0.35 | 10.0 |
| 4 | E/VA/CO | 62/29/9 | 15 | 27,000 | 181 | ...do... | 0.6 | 7.8/3.5/0.15 | 9.5 |
| 5 | E/VA/CO | 69/25/6 | 5 | 27,000 | 180 | ...do... | 0.45 | 11.1/4.1/0.12 | 9.7 |
| 6 | E/VA/CO | 71/26/3 | 28 | 27,000 | 181 | ...do... | 0.46 | 10.6/4.1/0.07 | 10.0 |
| 7 | E/VA/CO | 69/23/8 | 8 | 27,000 | 180 | ...do... | 0.34 | 11/4.1/0.11 | 10.3 |
| 8 | E/VA/CO | 56/31/13 | 18 | 27,000 | 180 | ...do... | 0.52 | 9/5.2/0.35 | 10.0 |
| 9 | E/VA/CO | 62/27/11 | 25 | 27,000 | 179 | t-Bu-peroxy isobutyrate | 0.16 | 7.8/3.1/0.14 | 10.4 |
| 10 | E/VA/CO | 66/27/11 | 24 | 27,000 | 179 | ...do... | 0.25 | 7.8/3.3/0.13 | 9.5 |
| 11 | E/VA/CO | 60/25/5 | 5 | 27,000 | 180 | ...do... | 0.08 | 7.8/2.9/0.15 | 10.3 |
| 12 | E/VA/CO | 63/26/11 | 50 | 24,000 | 181 | ...do... | 0.31 | 11.2/4.1/0.35 | 10.2 |
| 13 | E/VA/CO | 66/26/8 | 10 | 27,000 | 180 | ...do... | 0.15 | 12.7/4.3/0.2 | 12.3 |
| 14 | E/VA/CO | 64/24/12 | 0.4 | 27,000 | 180 | ...do... | 0.14 | 10.2/3.1/0.3 | 9.8 |
| 15 | E/VA/CO | 66/19/15 | 2.4 | 27,000 | 180 | ...do... | 0.36 | 7.9/1.8/0.3 | 10.3 |
| 16 | E/VA/CO | 69/23/8 | 8 | 27,000 | 180 | Azo-diisobutyronitrile | 0.34 | 11/4.1/0.11 | 10.3 |

See footnotes at end of table.

TABLE I—Continued

| Example No. | Product copolymer | | | Reaction conditions | | | | | |
|---|---|---|---|---|---|---|---|---|---|
| | Copolymer type [1] | Monomer ratio | Melt index | Pressure (p.s.i.) | Temp. (° C.) | Catalyst Type | Concentration [2] | Feed ratio E/termonomer/CO (parts by wt.) | Conversion (percent) |
| 17 | E/MMA/CO | 74/21/5 | 2.4 | 27,000 | 180 | t-Bu-peroxy isobutyrate | 1.9 | 9.4/0.41/0.3 | 9.8 |
| 18 | E/VP/CO | 61/24/15 | 2,500 | 27,000 | 185 | ___do___ | 0.42 | 7.5/2.6/0.3 | 8.8 |
| 19 | E/MVE/CO | 62/23/15 | 345 | 27,000 | 182 | ___do___ | 0.5 | 5/5/0.35 | 9.7 |
| 20 | E/IA/CO | 57/34/9 | 0.5 | 27,000 | 185 | ___do___ | 0.34 | 10/0.5/0.32 | 11.0 |
| 21 | E/VA/CO | 61/28/11 | 58 | 27,000 | 160 | ___do___ | 0.33 | 11/4.1/0.35 | 10.8 |
| 22 | E/VA/CO | 66/26/8 | 42 | 27,000 | 200 | ___do___ | 0.33 | 11/4.1/0.35 | 10.8 |
| 23 | E/VA/CO | 64/26/10 | 96 | 27,000 | 230 | t-Bu-peracetate | 0.20 | 11/4.1/0.3 | 10.5 |
| 24 | E/DMAEMA/CO | 68/17/15 | 2.9 | 27,000 | 185 | Azo-diisobutyronitrile | 3.8 | 11.5/0.34/0.4 | 9.7 |
| 25 | E/Neohexene/CO | N.D. | 4 | 24,000 | 193 | t-Bu-peracetate | 0.57 | 10/1.2/0.25 | 11.0 |
| 26 | E/MMA/CO | 75/10/15 | 150 | 27,000 | 210 | Azo-diisobutyronitrile | 11.0 | 10/0.15/0.52 | 9.5 |

[1] VA is vinyl acetate; MMA is methyl methacrylate; VP is vinyl propionate; MVE is methyl vinyl ether; IA is isobutyl acrylate; DMAEMA is dimethylaminoethyl methacrylate.
[2] Lb./1,000 lb. polymer product.

Examples 27–38

These examples relate to the preparation of blends of various of the copolymers of Examples 1–26 with polyvinyl chloride or modified vinyl chloride polymers, wax, or butyrate.

Example 27

Equal proportions of the copolymer of Example 1 (ethylene/vinyl acetate/carbon monoxide, 67/18/15) and General Tire and Rubber Company "Vygen" 110 polyvinyl chloride were blended as follows. The materials were mill blended on a 3 inch roll mill heated to 180° C., the ultimate melt temperature being 185° C. The polyvinyl chloride stabilized with a di[substituted], tin-S,S'-bis(isooctylmercapto acetate) thermostabilizer ("Thermolite" 31 sold by M & T Chemicals Inc.) was bonded to the mill first, and then the copolymer was added. Total component addition time was 2–3 minutes and the total mill time for sufficient blending was 10–12 minutes. The blend was taken off the hot mill and sheeted out by running it through a mill maintained at room temperature. The blend, which was clear, was then made into standard 10-mil thick test specimens by comparison molding at 185–190° C. at 40,000 p.s.i.g. and cycle times of 3–5 minutes, followed by gradual cooling at full pressure. The results are in Table II.

Extraction tests both in Example 27 and in Example 30 were conducted as follows. Samples were conditioned at 23° C. and 50% relative humidity for 24 hours before weighing and testing and were reconditioned similarly after testing.

Perchloroethylene extractions were run at 60° C. for 1 hour and 24 hours, by placing samples in a glass beaker on a hotplate and being stirred with a magnetic stirrer. The samples were dried with a paper towel, heated in an air oven at 60° C. for an hour, reconditioned and weighed.

Hexane extractions were run at 23° C. for 24 hours in 2-ounce glass bottles on a shaker, then dried, heated at 60° C. for an hour, reconditioned and weighed.

Detergent ("Tide") and soap ("Ivory") were 1% aqueous solutions. Tests were run in 24-ounce glass bottles at 60° C. for 24 hours. At the end of that period the samples were rinsed with water, wiped, placed in 60° C. air oven for 1 hour, then reconditioned and weighed.

TABLE II.—BLEND OF EXAMPLE 27

| Property | Result | Test No. |
|---|---|---|
| Tensile strength, p.s.i. | 4,570 | ASTM D 1708-66 1 inch/min. crosshead speed. |
| Percent elongation | 340 | |
| 100% secant modulus, p.s.i. | 1,760 | |
| Hardness—Shore A | 91 | ASTM D 2240-64T. |
| Resistance to extraction of terpolymer (percent weight loss): | | |
| (a) Soapy water, 24 hr., 60° C. | 0.0 | |
| (b) Detergent water, 24 hr., 60° C. | 0.0 | |
| (c) Hexane, 24 hr., 23° C. | 0.17 | |
| (d) Perchloroethylene, 1 hr., 60° C. | 2.2 | |
| (e) Perchloroethylene, 24 hr., 60° C. | 11.3 | |

Examples 28–35

Solution blends were made with copolymers and blend polymers of the materials and in the proportions set forth in Table III.

The solution blends were prepared by pouring together 10% solutions of polymer in tetrahydrofuran. Thus, in Example 28, 2 grams of copolymer in 20 ml. of tetrahydrofuran was poured into a solution of 2 grams of blend polymer in 20 ml. of tetrahydrofuran, followed by vigorous shaking to complete the mixing, and then removing the tetrahydrofuran over a steam bath. The remaining polymer blend was pressed into a 0.010-inch (10-mil) thick film at about 170° C. Observations on the films are reported in Table III.

With respect to the blend of Example 30, the following additional observations were made: hardness, Shore A, 90; brittleness, Masland film impact, −45° C. (50% break); brittleness temperature, bar, ASTM D 746, −66° C.; resistance to extraction of copolymer:

Percent wt. loss
(a) Soapy water (Ivory), 24 hr., 60° C. _____ 0.17
(b) Detergent water (Tide), 24 hr., 60° C. _____ 0.0
(c) Hexane, 24 hr., 23° C. _____ 0.11
(d) Gasoline, 24 hr., 23° C. _____ 0.0
(e) Perchloroethylene, 1 hr., 60° C. _____ 1.8
(f) Perchloroethylene, 24 hr., 60° C. _____ 7.2

TABLE III.—BLENDS

| Copolymer | | | | PVC/ copolymer ratio (wt. percent) | Flim properties | | | |
|---|---|---|---|---|---|---|---|---|
| E/X/CO ratio | X | Ex. No. | PVC blend polymer type | | Tensile strength (p.s.i.) | Elongation (percent) | 100% secant modulus (p.s.i.) | Observation |
| Control | | | PVC [1] | 100/0 | 6,520 | 54 | >350,000 | Brittle. |
| Example No.: | | | | | | | | |
| 28 | 57/31/12 | VA | 3 | PVC [2] | 50/50 | | | 560 | Clear, extremely limp. |
| 29 | 57/31/12 | VA | 3 | PVC [2] | 55/45 | 4,030 | 290 | 1,420 | Clear. |
| 30 | 62/27/11 | VA | 9 | PVC [2] | 55/45 | 4,000 | 330 | 1,340 | Clear, very limp. |
| 31 | 63/26/11 | VA | 12 | PVC propylene modified [3] | 55/45 | | | | Do. |
| 32 | 63/26/11 | VA | 12 | 90% VC,[4] 10% VA | 55/45 | | | | Do. |
| 33 | 74/21/5 | MMA | 17 | PVC [2] | 50/50 | | | | Clear, moderately limp. |
| 34 | 61/24/15 | VP | 18 | PVC [2] | 50/50 | | | | Clear, limp. |
| 35 | 62/23/15 | MVE | 19 | PVC [2] | 50/50 | | | | Very limp, clear. |

[1] Diamond 40 PVC.
[2] General Tire & Rubber Company "Vygen" 110 PVC.
[3] Air Reduction Company Airco 401.
[4] Union Carbide VYNS.

Example 36

Solution blends were prepared as in Examples 28–35 using the copolymer of Example 8, and "Vygen" 110 as the polyvinyl chloride, plus the following conventional low molecular plasticizers: di-2-ethyl hexyl phthalate, di-2-ethyl hexyl adipate, di-2-ethyl hexyl sebecate, di-isodecyl phthalate, an epoxidized soy bean oil (Union Carbide Flexol EPO), and an ethylene glycol adipate (Rohm & Haas Paraplex G-54). The weight ratio of PVC/copolymer/plasticizer was 60/25/10 and 65/10/25, in two series of runs. Films prepared as in Examples 28–35 from each of these blends were clear and limp.

Example 37

A melt blend of the copolymer of Example 6, 71E/26VA/3CO, was prepared at 150° C. with various proportions of a paraffin wax having a melting range of 61–65° C. A clear, compatible blend was obtained in each case:

TABLE IV

| Weight copolymer (percent) | Tensile strength (p.s.i.) | Percent elongation | Initial modulus (p.s.i.) |
|---|---|---|---|
| 10 | 410 | 3 | 39,000 |
| 20 | 400 | 3 | 41,000 |
| 30 | 425 | 26 | 23,000 |

Example 38

A solution blend was prepared by the technique of Examples 28–35, from 3 parts of cellulose acetate butyrate (Tennessee-Eastman "½-second butyrate") and 1 part of the ethylene/vinyl acetate/carbon monoxide copolymer of Example 8. The blend was then melt-pressed into a 10-mil thick film at 175° C. The film was compatible, since it was clear and could be bent double without breaking.

What is claimed is:

1. A polymeric composition comprising a blend of a copolymer consisting essentially of, by weight, (a) 40–80% ethylene, (b) 3–30% carbon monoxide, and (c) 5–60% of one or more monomers copolymerizable therewith in order to produce solid copolymers, wherein said (c) is selected from the group consisting of unsaturated mono- or dicarboxylic acids of 2–20 carbon atoms, esters of said unsaturated mono- or dicarboxylic acids, vinyl esters of saturated carboxylic acids where the acid group has 1–18 carbon atoms, vinyl alkyl ethers wherein the alkyl group has 1–18 carbon atoms, acrylonitrile, methacrylonitrile, norbornene, alpha-olefins of 3–12 carbon atoms, and vinyl aromatic compounds with a compatible amount of at least one solid organic polymer selected from the group consisting of vinyl halide polymers and vinylidene halide polymers.

2. The composition of claim 1 wherein the solid organic polymer is polyvinyl chloride.

3. The composition of claim 2 comprising by weight, 5–95% of a copolymer consisting essentially of (a) 40–80% ethylene, (b) 3–30% carbon monoxide, (c) 5–60% of one or more monomers copolymerizable therewith to produce solid copolymers, and 5–95% polyvinyl chloride.

4. The composition of claim 2 comprising by weight, 5–95% of a copolymer consisting essentially of (a) 40–80% ethylene, (b) 3–30% carbon monoxide, and (c) 5–60% of at least one monomer selected from the group consisting of unsaturated mono- or dicarboxylic acids of 2–20 carbon atoms, esters of said unsaturated mono- or dicarboxylic acids, vinyl esters of saturated carboxylic acids where the acid group has 1–18 carbon atoms, vinyl alkyl ethers wherein the alkyl group has 1–18 carbon atoms, acrylonitrile, methacrylonitrile, norbornene, alpha-olefins of 3–12 carbon atoms, and vinyl aromatic compounds, said copolymer having a melt index within the range of 0.1–3,000, and 5–95% polyvinyl chloride.

5. A composition according to claim 4 useful for producing limp film, comprising, by weight, 30–65% polyvinyl chloride and 35–70% of said copolymer, said copolymer consisting essentially of 40–80% ethylene, 10–60% vinyl acetate, and 3–30% carbon monoxide.

6. A compatible limp film of the composition of claim 5.

7. A composition according to claim 4 useful for producing rigid articles comprising, by weight, 75–95% polyvinyl chloride and 5–25% of said copolymer, said copolymer consisting essentially of 40–80% ethylene, 5–50% vinyl acetate, and 3–10% carbon monoxide.

8. A compatible rigid article of the composition of claim 7.

9. A composition according to claim 4 useful for producing semi-rigid articles comprising, by weight, 50–75% polyvinyl chloride and 25–50% of said copolymer, said copolymer consisting essentially of 40–80% ethylene, 5–50% vinyl acetate, and 3–10% carbon monoxide.

10. A compatible semi-rigid article of the composition of claim 9.

11. An easily processible composition of matter according to claim 4 comprising, by weight, 5–30% polyvinyl chloride and 70–95% of said copolymer.

References Cited

UNITED STATES PATENTS

| 2,495,286 | 1/1950 | Brubaker | 260—63 CO |
| 3,322,862 | 5/1967 | Havens et al. | 260—897 C |
| 3,426,106 | 2/1969 | Zijp et al. | 260—897 C |
| 3,463,751 | 8/1969 | Hasegawa et. al. | 260—897 C X |
| 3,517,083 | 6/1970 | Salyer | 260—897 C X |

WILLIAM H. SHORT, Primary Examiner
L. M. PHYNES, Assistant Examiner

U.S. Cl. X.R.

260—17 R, 18 EP, 27 EV, 28.5 AV, 63 CQ, 66, 78.5 BB, E, 80.76, 80.78, 80.8, 80.81, 857 UN, 897 C